(12) United States Patent
Kim (10) Patent No.: US 10,073,437 B2
(45) Date of Patent: Sep. 11, 2018

(54) METHOD AND APPARATUS FOR COMPENSATING THERMAL DISPLACEMENT OF MACHINE TOOL

(71) Applicant: DOOSAN MACHINE TOOLS CO., LTD., Chang-won-si, Gyeongsangnam-do (KR)

(72) Inventor: Ki Hong Kim, Gimhae-si (KR)

(73) Assignee: DOOSAN MACHINE TOOLS CO., LTD., Chang-won-si, Gyeongsangnam-do (KR)

( * ) Notice: Subject to any disclaimer, the term of this patent is extended or adjusted under 35 U.S.C. 154(b) by 322 days.

(21) Appl. No.: 14/925,397

(22) Filed: Oct. 28, 2015

(65) Prior Publication Data

US 2016/0124419 A1     May 5, 2016

(30) Foreign Application Priority Data

Nov. 3, 2014 (KR) .......................... 10-2014-0151274

(51) Int. Cl.
G05B 19/40 (2006.01)
G05B 19/404 (2006.01)

(52) U.S. Cl.
CPC .. *G05B 19/404* (2013.01); *G05B 2219/49205* (2013.01); *G05B 2219/49219* (2013.01)

(58) Field of Classification Search
None
See application file for complete search history.

(56) References Cited

U.S. PATENT DOCUMENTS

| | | | |
|---|---|---|---|
| 2002/0038189 A1* | 3/2002 | Mizuguchi | B23Q 15/18 702/94 |
| 2006/0218811 A1* | 10/2006 | Sato | G05B 19/404 33/702 |
| 2007/0213867 A1* | 9/2007 | Prust | B23Q 11/0007 700/193 |
| 2008/0136402 A1* | 6/2008 | Sato | G01K 7/42 324/105 |
| 2012/0143369 A1* | 6/2012 | Prust | G05B 19/404 700/179 |
| 2014/0379117 A1* | 12/2014 | Nishimura | G05B 19/404 700/173 |
| 2015/0012126 A1* | 1/2015 | Sasaki | G05D 23/1917 700/186 |

* cited by examiner

*Primary Examiner* — Jason Lin
(74) *Attorney, Agent, or Firm* — Hauptman Ham, LLP (57) ABSTRACT

Disclosed are a method and an apparatus for compensating thermal displacement of a machine tool, the apparatus including: a compensation quantity calculating unit configured to calculate a compensation quantity by using temperature data and a predetermined compensation parameter; a smoothing filter configured to exponentially smooth the calculated compensation quantity; a scaling unit configured to scale the exponentially smoothed compensation quantity; a time-dispersion compensating unit configured to calculate a final compensation quantity by time-dispersion compensation for the scaled compensation quantity according to a time-dispersion compensating period; and a control unit configured to compensate each axis of equipment according to the final compensation quantity, and adjusts the time-dispersion compensating period of the time-dispersion compensating unit according to an error absolute value representing a difference between an input value and an output value of the time-dispersion compensating unit.

8 Claims, 5 Drawing Sheets

METHOD AND APPARATUS FOR COMPENSATING THERMAL DISPLACEMENT OF MACHINE TOOL

CROSS-REFERENCE TO RELATED APPLICATIONS

This application is based on and claims priority from Korean Patent Application No. 10-2014-0151274, filed on Nov. 3, 2014, with the Korean Intellectual Property Office, the disclosure of which is incorporated herein in its entirety by reference.

FIELD OF THE DISCLOSURE

The present disclosure relates to a method for compensating thermal displacement of a machine tool, and more particularly, to a method and an apparatus for compensating thermal displacement of a machine tool, which enables compensating data to rapidly follow actual displacement without requiring a long warming-up time even when actual thermal displacement of equipment is sharply generated.

BACKGROUND OF THE DISCLOSURE

In general, a machine tool refers to a machine used for the purpose of processing a metal or non-metal workpiece in a desired shape and size by using various tools by various cutting processing methods or non-cutting processing methods.

The machine tool is generally classified into a turning center and a machining center according to a processing method. Here, the turning center processes a workpiece by rotating the workpiece, and the machining center processes a workpiece by rotating a tool. Accordingly, the machine tool has a spindle device for rotating a workpiece or a tool. Further, the spindles are mounted on a transfer system and transferred in order to process various sizes and types of workpieces.

However, columns supporting the spindles may be thermally deformed by heat generated due to friction of the transfer system and the like during the processing process of the workpiece, and thus location preciseness of the machine tool deteriorates and a defect is generated in a processed good.

Figure 1:
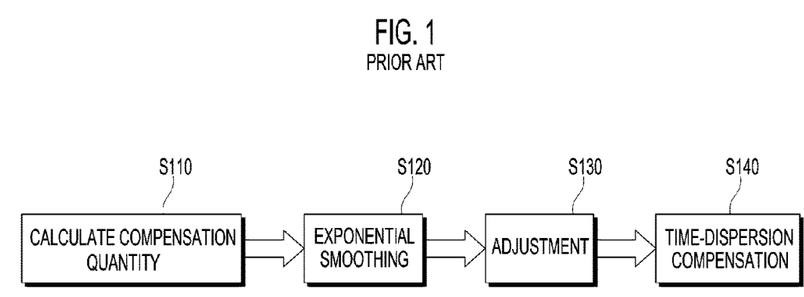
FIG. 1 is a diagram for describing a method for compensating thermal displacement in the related art.

In order to solve the problem, a method for compensating thermal displacement illustrated in FIG. 1 is suggested.

Referring to FIG. 1, a compensation quantity is calculated by using temperature data and a predetermined compensation parameter (S110), and the calculated compensation quantity is exponentially smoothed (S120), and the exponentially smoothed compensation quantity is scaled (S130).

Final data obtained by time-dispersion compensation for the scaled compensation quantity (S140) is used as a compensation quantity of each axis of equipment. Here, the time-dispersion compensation is a method of maximizing a processing quality by compensating each axis of equipment by a predetermined compensation unit (1 or 0.1 μm) for each time-dispersion compensating period when the compensation quantity calculated based on the temperature data is changed.

As described above, in the related art, a sharp change in a compensation quantity by noise or ripple of temperature data obtained by a temperature sensor does not influence a surface quality of a processed good, through thermal displacement compensation.

However, the exponential smoothing and the time-dispersion compensation of the compensation quantity essentially cause a time delay, and thus when thermal displacement of equipment is sharply generated, an error between actual thermal displacement and the compensation quantity of the equipment may be generated, and thus an error and the like may be generated in a size of a processed good.

In order to solve the problem, an existing method of performing processing after an error between actual thermal displacement and a compensation quantity of the equipment is sufficiently decreased through a sufficient warming-up time is used, but in this case, there is a problem in that a processing time is increased by the warming-up time.

SUMMARY

The present disclosure has been made in an effort to provide a method and an apparatus for compensating thermal displacement of a machine tool, which enables compensating data to rapidly follow actual displacement without requiring a long warming-up time even when actual thermal displacement of equipment is sharply generated.

An exemplary embodiment of the present disclosure provides an apparatus for compensating thermal displacement of a machine tool, the apparatus including: a compensation quantity calculating unit configured to calculate a compensation quantity by using temperature data and a predetermined compensation parameter; a smoothing filter configured to exponentially smooth the compensation quantity calculated by the compensation quantity calculating unit; a scaling unit configured to scale the compensation quantity exponentially smoothed by the smoothing filter; a time-dispersion compensating unit configured to calculate a final compensation quantity by time-dispersion compensation for the compensation quantity scaled by the scaling unit according to a time-dispersion compensating period; and a control unit configured to compensate each axis of equipment according to the final compensation quantity calculated by the time-dispersion compensating unit, in such a manner in which when an error absolute value representing a difference between an input value and an output value of the time-dispersion compensating unit is equal to or larger than a predetermined threshold parameter, the control unit adjusts the time-dispersion compensating period of the time-dispersion compensating unit according to the error absolute value.

The apparatus may further include a processing determining unit configured to determine a cutting state or a non-cutting state of the equipment, in which when the equipment is in the non-cutting state as a result of the determination by the processing determining unit, the control unit may bypass the compensation quantity calculated by the compensation quantity calculating unit without making the compensation quantity pass through the smoothing filter.

When the error absolute value is smaller than the predetermined threshold parameter, the time-dispersion compensating period may be a predetermined period parameter.

The control unit may adjust the time-dispersion compensating period according to Equation 1 below $$\text{Time-dispersion compensating period} = \text{predetermined period parameter} - \text{compensating period decrease rate} \times (\text{error absolute value} - \text{predetermined threshold parameter}). \quad [\text{Equation 1}]$$

The control unit may clamp the adjusted time-dispersion compensating period as a minimum compensating period.

Another exemplary embodiment of the present disclosure provides a method for compensating thermal displacement of a machine tool, the method including: calculating a compensation quantity by using temperature data and a predetermined compensation parameter; exponentially smoothing the calculated compensation quantity; scaling the exponentially smoothed compensation quantity; calculating a final compensation quantity by time-dispersion compensation for the scaled compensation quantity according to the time-dispersion compensating period; calculating an error absolute value representing a difference between an input value and an output value of the time-dispersion compensation; determining whether the error absolute value is equal to or larger than a predetermined threshold parameter; adjusting the time-dispersion compensating period according to the error absolute value when the error absolute value is equal to or larger than the predetermined threshold parameter; and compensating each axis of equipment according to the calculated final compensation quantity.

The method may further include: determining a cutting state or a non-cutting state of the equipment; and when the equipment is in the non-cutting state as a result of the determination, bypassing the calculated compensation quantity without making the compensation quantity be subjected to the exponential smoothing.

The time-dispersion compensating period may be adjusted by Equation 2 below.

Time-dispersion compensating period=predetermined period parameter−compensating period decrease rate×(error absolute value−predetermined threshold parameter). [Equation 2]

As described above, according to the present specification, there are provided the method and the apparatus for compensating thermal displacement of the machine tool, which bypass the smoothing filter when equipment is in a non-cutting state, and adjust a time-dispersion compensating period according to an error between actual thermal displacement and a compensation quantity, thereby minimizing a delay error by the smoothing filter, and making compensating data rapidly follow actual displacement without requiring a long warming-up time even when actual thermal displacement of the equipment is sharply generated.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawing, which form a part hereof. The illustrative embodiments described in the detailed description, drawing, and claims are not meant to be limiting. Other embodiments may be utilized, and other changes may be made, without departing from the spirit or scope of the subject matter presented here.

It should be noted that technical terms used in the present specification are used only to describe a specific exemplary embodiment, and do not intend to limit the present disclosure. Further, technical terms used in the present specification shall be interpreted as a meaning generally understood by those skilled in the art unless they are specially defined in the present specification in a different meaning, and shall not be construed in excessively general or narrow meanings. Further, when technical terms used in the present specification are improper technical terms, which fail to correctly express the spirit of the present disclosure, the technical terms shall be substituted with technical terms, which those skilled in the art may properly understand, to be understood. Further, a general term used in the present disclosure shall be construed according to a meaning defined in a dictionary or the context of a related description, and shall not be construed to have an excessively narrow meaning.

The singular forms used in the present specification include the plural forms, unless the context clearly indicates otherwise. In the present application, a term, "comprise" or "include" shall not be construed as essentially including several constituent elements or several steps described in the specification, and it shall be construed that some constituent elements or some steps may not be included, or additional constituent elements or steps may be further included.

Suffixes, "module" and "unit", for constituent elements used in the present specification are given or mixed and used by considering easiness in preparing a specification and do not have a meaning or role distinguished from each other in themselves.

Terms including ordinal numbers, such as "first" and "second", used in the present specification may be used for describing various constituent elements, but the constituent elements should not be limited by the terms. The above terms are used only to discriminate one constituent element from another constituent element. For example, without departing from the scope of the present disclosure, a first constituent element may be referred to as a second constituent element and similarly, a second constituent element may also be referred to as a first constituent element.

Hereinafter, an exemplary embodiment of the present disclosure will be described in detail with reference to the accompanying drawings, in which like reference numerals refer to like or similar constituent elements regardless of the reference numerals and a duplicated description thereof will be omitted.

In describing the present disclosure, when it is determined that detailed description relating to well-known functions or configurations may make the subject matter of the present disclosure unnecessarily ambiguous, the detailed description will be omitted. Further, it is noted that the accompanying drawings are used just for easily appreciating the spirit of the present disclosure and it should not be analyzed that the spirit of the present disclosure is limited by the accompanying drawings.

Figure 2:
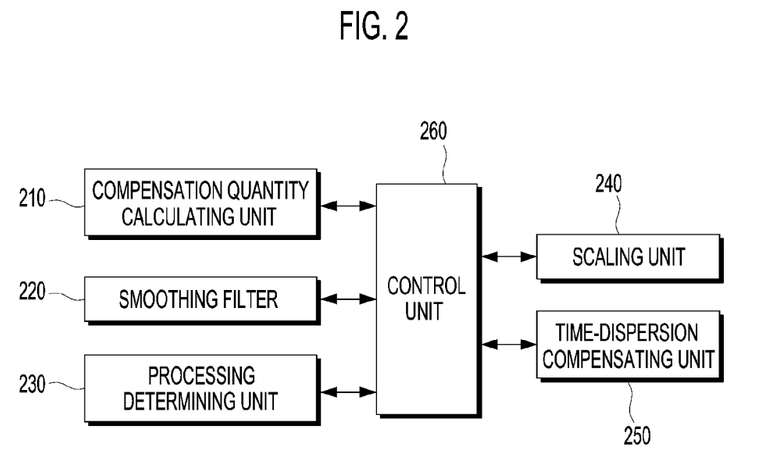
FIG. 2 is a block diagram illustrating a schematic configuration of an internal side of an apparatus for compensating thermal displacement of a machine tool according to an exemplary embodiment of the present disclosure.

FIG. 2 is a block diagram illustrating a schematic configuration of an internal side of an apparatus for compensating thermal displacement of a machine tool according to an exemplary embodiment of the present disclosure.

Referring to FIG. 2, the apparatus for compensating thermal displacement of the machine tool according to the present disclosure includes a compensation quantity calculating unit 210, a smoothing filter 220, a processing determining unit 230, a scaling (adjustment) unit 240, a time-dispersion compensating unit 250, and a control unit 260.

The compensation quantity calculating unit 210 calculates a compensation quantity by using temperature data and a predetermined compensation parameter.

The smoothing filter 220 exponentially smooths the compensation quantity calculated by the compensation quantity calculating unit 210.

The processing determining unit 230 determines a cutting state or a non-cutting state of equipment through a processing code. Here, the processing determining unit 230 may receive the processing code from a numerical value control device in order to determine the cutting state or the non-cutting state of the equipment.

The scaling unit 240 scales the compensation quantity exponentially smoothed by the smoothing filter 220.

The time-dispersion compensating unit 250 calculates a final compensation quantity by time-dispersion compensation for the compensation quantity scaled by the scaling unit 240 according to a time-dispersion compensating period. Here, the time-dispersion compensation is a method of maximizing a processing quality by compensating each axis of the equipment by a predetermined compensation unit (1 or 0.1 μm) for each time-dispersion compensating period when the compensation quantity calculated based on the temperature data is changed.

The control unit 260 compensates each axis of the equipment according to the final compensation quantity calculated by the time-dispersion compensating unit 250.

When the equipment is in the non-cutting state as a result of the determination by the processing determining unit 230, the control unit 260 bypasses the compensation quantity calculated by the compensation quantity calculating unit 210 without making the compensation quantity pass through the smoothing filter 220, thereby minimizing a delay error by the smoothing filter 220.

When an error absolute value representing a difference between an input value and an output value of the time-dispersion compensating unit 250 is equal to or larger than a predetermined threshold parameter, the control unit 260 adjusts the time-dispersion compensating period of the time-dispersion compensating unit 250 according to the error absolute value, and clamps the adjusted time-dispersion compensating period as a minimum compensating period. Here, the input value of the time-dispersion compensating unit 250 means the compensation quantity scaled by the scaling unit 240, and the output value of the time-dispersion compensating unit 250 means the final compensation quantity calculated by the time-dispersion compensating unit 250. The control unit 260 may adjust the time-dispersion compensating period according to Equation 1 below.

$$\text{Time-dispersion compensating period} = b - c \times (\text{error absolute value} - a) \quad \text{[Equation 1]}$$

Here, a represents a predetermined threshold parameter, b represents a predetermined period parameter, and c represents a compensating period decrease rate.

Accordingly, the apparatus for compensating thermal displacement of the machine tool according to the present disclosure may more rapidly decrease a following error by making a compensation quantity calculated at a faster period follow actual thermal displacement by automatically decreasing a compensating period by the time-dispersion compensating function when the following error is large.

When the error absolute value is smaller than the predetermined threshold parameter, the control unit 260 uses the predetermined period parameter as the time-dispersion compensating period.

Figure 3:
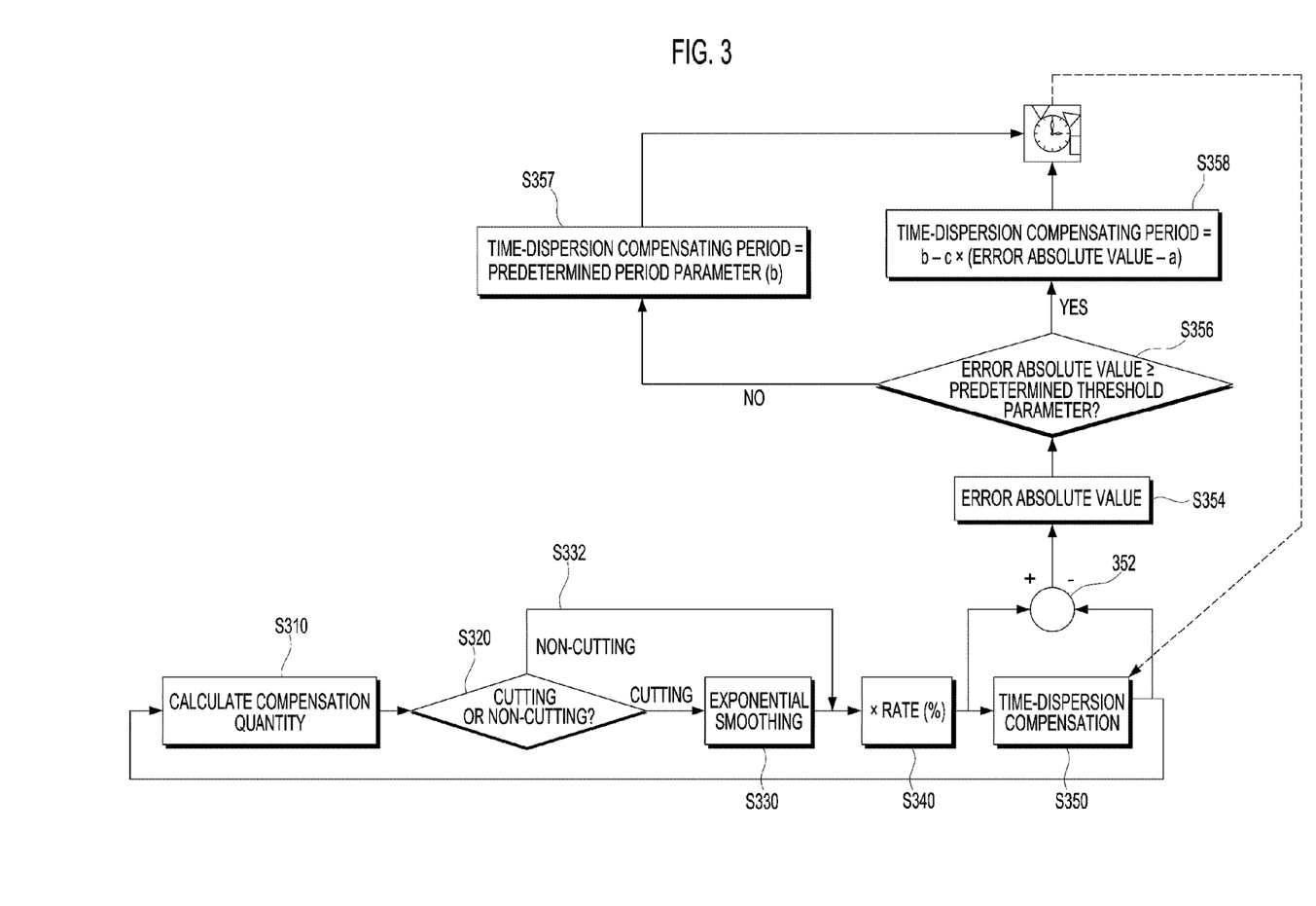
FIG. 3 is a diagram for describing a method for compensating thermal displacement of a machine tool according to an exemplary embodiment of the present disclosure.

FIG. 3 is a diagram for describing a method for compensating thermal displacement of a machine tool according to an exemplary embodiment of the present disclosure.

Referring to FIG. 3, the compensation quantity calculating unit 210 calculates a compensation quantity by using temperature data and predetermined compensation data (S310).

The processing determining unit 230 determines a cutting state (CUT=1) or a non-cutting state (CUT=0) of equipment through a processing code (S320). That is, the processing determining unit 230 determines whether the equipment is in the cutting state or the non-cutting state.

When the equipment is in the non-cutting state as a result of the determination by the processing determining unit 230, the control unit 260 bypasses the compensation quantity calculated by the compensation quantity calculating unit 210 without making the compensation quantity pass through the smoothing filter 220 (S332).

When the equipment is in the cutting state as a result of the determination by the processing determining unit 230, the control unit 260 exponentially smooths the compensation quantity calculated by the compensation quantity calculating unit 210 through the smoothing filter 220 (S330).

The scaling unit 240 scales the compensation quantity calculated by the compensation quantity calculating unit 210 or the compensation quantity exponentially smoothed by the smoothing filter 220 (S340).

The time-dispersion compensating unit 250 calculates a final compensation quantity by time-dispersion compensation for the compensation quantity scaled by the scaling unit 240 according to a time-dispersion compensating period (S350).

Next, the control unit 260 adds/subtracts an input value and an output value of the time-dispersion compensating unit 250 (S352), and calculates an error absolute value representing a difference between the input value and the output value of the time-dispersion compensating unit 250 (S354).

The control unit 260 determines whether the error absolute value is equal to or larger than a predetermined threshold parameter (S356), and when the error absolute value is equal to or larger than the predetermined threshold parameter, the control unit 260 adjusts the time-dispersion compensating period of the time-dispersion compensating unit 250 according to Equation 1 (S358).

When the error absolute value is smaller than the predetermined threshold parameter, the control unit 260 uses a predetermined period parameter as the time-dispersion compensating period of the time-dispersion compensating unit 250 (S357).

Finally, the control unit 260 compensates each axis of the equipment according to the final compensation quantity calculated by the time-dispersion compensating unit 250.

The aforementioned method may be implemented by various means. For example, the exemplary embodiments of the present disclosure will be implemented by hardware, firmware, software, or a combination thereof.

When the exemplary embodiments of the present disclosure are implemented by hardware, the method according to the exemplary embodiments of the present disclosure may be implemented by one or more of application specific integrated circuits (ASICs), digital signal processors (DSPs), digital signal processing devices (DSPDs), programmable logic devices (PLDs), field programmable gate arrays (FPGAs), a processor, a control unit, a micro-control unit, and a microprocessor.

When the exemplary embodiments of the present disclosure are implemented by firmware or software, the method according to the exemplary embodiments of the present disclosure may be implemented by a form of a module, a procedure, a function, and the like performing the aforementioned functions or operations. A software code may be stored in a memory unit and driven by a processor. The memory unit may be positioned inside or outside the processor to transceive data with the processor by already publicly known various means.

Figure 4A:
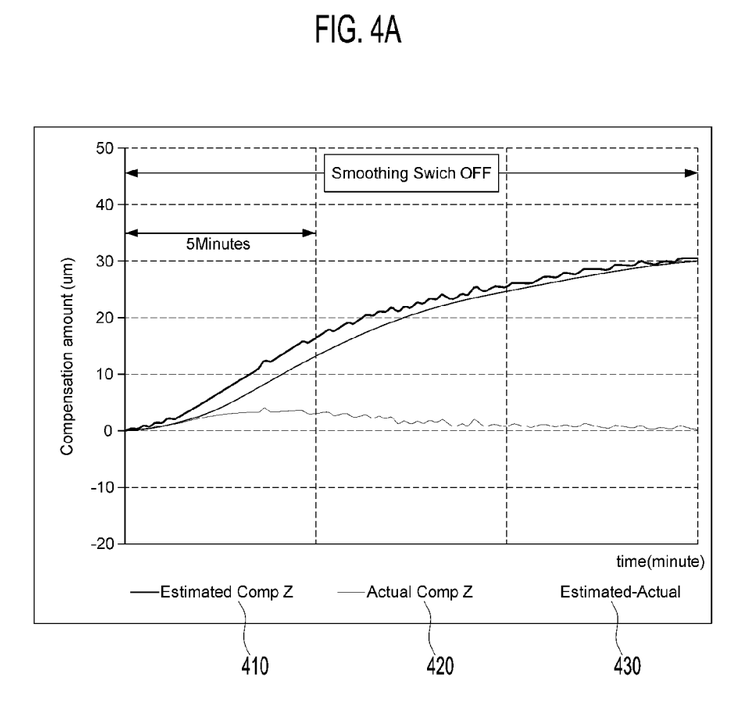
FIGS. 4A and 4B are graphs for comparing results of the apparatus for compensating thermal displacement in the related art and the apparatus for compensating thermal displacement according to the present disclosure.
Figure 4B:
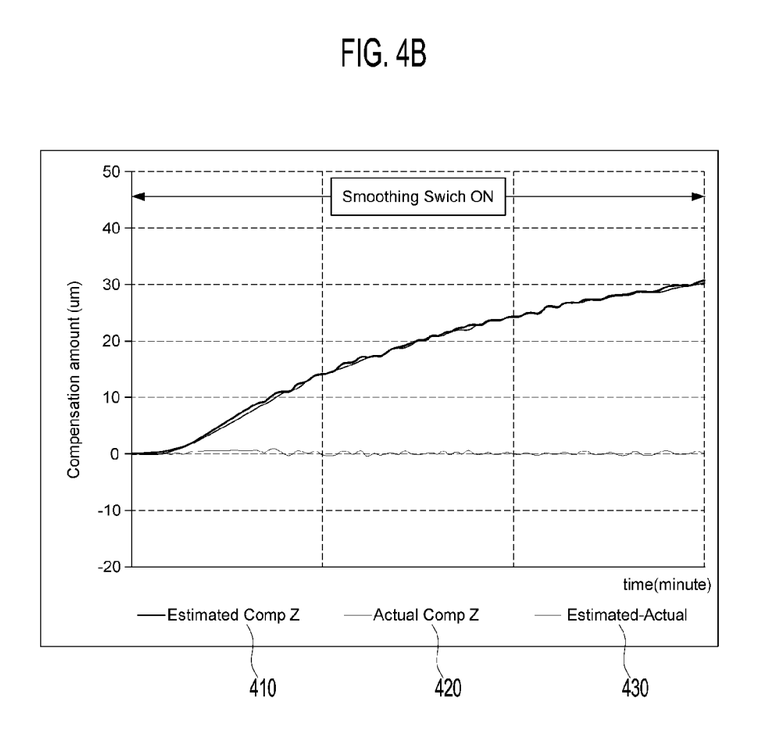

FIGS. 4A and 4B are graphs for comparing results of the apparatus for compensating thermal displacement in the related art and the apparatus for compensating thermal displacement according to the present disclosure. Particularly, FIG. 4A is a graph illustrating a result of the apparatus for compensating thermal displacement in the related art, and FIG. 4B is a graph illustrating a result of the apparatus for compensating thermal displacement according to the present disclosure.

Referring to FIGS. 4A and 4B, it can be seen that in the apparatus for compensating thermal displacement of the machine tool according to the present disclosure, a following error 430 generated by a reason that a final compensation quantity 410 fails to follow actual thermal displacement 420 of equipment is considerably decreased at an early time.

Accordingly, the apparatus for compensating thermal displacement of the machine tool according to the exemplary embodiment of the present disclosure may considerably decrease a warming-up time of equipment while maintaining an existing processing quality.

The exemplary embodiments disclosed in the present specification have been described with reference to the accompanying drawings. As described above, the exemplary embodiments illustrated in the respective drawings shall not be limitedly construed, and it may be construed that the exemplary embodiments may be combined by those skilled in the art fully understanding the contents of the present specification, and when the exemplary embodiments are combined, some constituent elements may be omitted.

Here, the terms or words used in the present specification and the claims should not be construed as being limited as a commonly used or lexical meaning, and should be construed as a meaning and a concept to conform with the technical spirit disclosed in the present specification.

Therefore, the exemplary embodiments described in the present specification and the configurations illustrated in the drawings are only an exemplary embodiment disclosed in the present specification and do not represent all of the technical spirit disclosed in the present specification, and thus it is to be understood that various equivalent matters and modified examples, which may replace the exemplary embodiments and the configurations, are possible at the time of filing the present application.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. An apparatus for compensating thermal displacement of a machine tool, the apparatus comprising:
   a compensation quantity calculator configured to calculate a compensation quantity by using temperature data and a predetermined compensation parameter;
   a smoothing filter configured to smooth the compensation quantity calculated by the compensation quantity calculator;
   a scaler configured to scale the compensation quantity smoothed by the smoothing filter;
   a time-dispersion compensator configured to generate a signal indicating a final compensation quantity by calculating the final compensation quantity by time-dispersion compensation for the compensation quantity scaled by the scaler according to a time-dispersion compensating period; and
   a controller configured to compensate each axis of the machine tool, in response to the signal indicating the final compensation quantity, according to the final compensation quantity calculated by the time-dispersion compensator, in such a manner in which
   when an error absolute value representing a difference between an input value and an output value of the time-dispersion compensating unit is equal to or larger than a predetermined threshold parameter, the controller the time-dispersion compensating period of the time-dispersion compensating unit according to the error absolute value; and
   wherein the machine tool is controlled based on the calculated final compensation quantity and the time-dispersion compensating period.

2. The apparatus of claim 1, further comprising:
   a processor configured to determine a cutting state or a non-cutting state wherein when the equipment is in the non-cutting state as a result of the determination by the processor, the control unit bypasses the compensation quantity calculated by the compensation quantity calculator without making the compensation quantity pass through the smoothing filter.

3. The apparatus of claim 1, wherein the controller adjusts the time-dispersion compensating period according to Equation 1 below:

$$\text{Time-dispersion compensating period} = \text{predetermined period parameter} - \text{compensating period decrease rate} \times (\text{error absolute value} - \text{predetermined threshold parameter}).$$ [Equation 1]

4. The apparatus of claim 1, wherein the controller clamps the adjusted time-dispersion compensating period as a minimum compensating period.

5. The apparatus of claim 1, wherein when the error absolute value is smaller than the predetermined threshold parameter, the time-dispersion compensating period is a predetermined period parameter.

6. A method performed by an apparatus for compensating thermal displacement of a machine tool, the apparatus includes one or more application specific integrated circuits (ASICs) to execute the method comprising:
   calculating a compensation quantity by using temperature data and a predetermined compensation parameter;
   exponentially smoothing the calculated compensation quantity;
   scaling the exponentially smoothed compensation quantity;
   calculating a final compensation quantity by time-dispersion compensation for the scaled compensation quantity according to time-dispersion compensating period;
   calculating an error absolute value representing a difference between an input value and an output value of the time-dispersion compensation;

determining whether the error absolute value is equal to or larger than a predetermined threshold parameter;

adjusting the time-dispersion compensating period according to the error absolute value when the error absolute value is equal to or larger than the predetermined threshold parameter, and compensating each axis of the machine tool according to the calculated final compensation quantity.

7. The method of claim 6, further comprising:

determining a cutting state or a non-cutting state of the equipment; and when the equipment is in the non-cutting state as a result of the determination, bypassing the calculated compensation quantity without making the compensation quantity be subjected to the exponential smoothing.

8. The method of claim 6, wherein the time-dispersion compensating period is adjusted by Equation 2 below:

$$\text{Time-dispersion compensating period} = \text{predetermined period parameter} - \text{compensating period decrease rate} \times (\text{error absolute value} - \text{predetermined threshold parameter}). \quad [\text{Equation 2}]$$

\* \* \* \* \*